(12) United States Patent
Abiri et al.

(10) Patent No.: US 10,727,686 B2
(45) Date of Patent: Jul. 28, 2020

(54) WIRELESSLY CHARGEABLE PORTABLE POWER BANK

(71) Applicant: California Institute of Technology, Pasadena, CA (US)

(72) Inventors: Behrooz Abiri, Alhambra, CA (US); Florian Bohn, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/010,318

(22) Filed: Jun. 15, 2018

(65) Prior Publication Data
US 2019/0140467 A1    May 9, 2019

Related U.S. Application Data

(60) Provisional application No. 62/520,022, filed on Jun. 15, 2017.

(51) Int. Cl.
*H01M 10/44* (2006.01)
*H01M 10/46* (2006.01)
(Continued)

(52) U.S. Cl.
CPC .............. *H02J 7/025* (2013.01); *H02J 50/10* (2016.02); *H02J 7/00* (2013.01); *H02J 7/0047* (2013.01);
(Continued)

(58) Field of Classification Search
CPC .......... H02J 7/0042; H02J 7/355; H02J 5/005; H02J 7/025; H02J 7/0021; H02J 7/0026; H02J 7/007; H02J 50/10; H02J 50/20
(Continued)

(56) References Cited

U.S. PATENT DOCUMENTS

| 9,711,670 | B2 * | 7/2017 | Grimes | ........... H01L 31/035218 |
| 10,418,839 | B2 * | 9/2019 | Miller | ..................... H02J 50/10 |

(Continued)

FOREIGN PATENT DOCUMENTS

CN    204271723 U    4/2015

OTHER PUBLICATIONS

WIPO Application No. PCT/US2018/037911, PCT International Search Report and Written Opinion of the International Searching Authority dated Sep. 6, 2018.

*Primary Examiner* — Edward Tso
(74) *Attorney, Agent, or Firm* — Alston & Bird LLP

(57) ABSTRACT

A power bank includes, in part, a rechargeable battery, a wireless power recovery unit adapted to receive power wirelessly, a battery charging circuit adapted to deliver the power recovered by the power recovery unit to the rechargeable battery, an output interface, and a voltage reconditioning circuit adapted to supply power from the rechargeable battery to the output interface for delivery to an external device. The wireless power recovery unit may include one or more of a multitude of photodiodes adapted to convert a coherent optical signal to electrical power, an acoustic transducer adapted to convert acoustic waves to an electrical power, an inductive coupling circuit adapted to convert time varying magnetic flux to electrical power, and an RF power recovery unit adapted to convert an RF signal to electrical power.

20 Claims, 8 Drawing Sheets

(51) Int. Cl.
    *H02J 7/02*     (2016.01)
    *H02J 50/10*    (2016.01)
    *H02J 50/30*        (2016.01)
    *H02J 50/20*        (2016.01)
    *H02J 50/80*        (2016.01)
    *H02J 7/00*         (2006.01)

(52) U.S. Cl.
    CPC ............... *H02J 7/027* (2013.01); *H02J 50/20* (2016.02); *H02J 50/30* (2016.02); *H02J 50/80* (2016.02); *H02J 2207/20* (2020.01); *H02J 2207/40* (2020.01)

(58) Field of Classification Search
    USPC ....... 320/101, 107, 108, 128, 132, 148, 103, 320/112
    See application file for complete search history.

(56) References Cited

U.S. PATENT DOCUMENTS

| | | |
|---|---|---|
| 2006/0187071 A1 | 8/2006 | Kortum et al. |
| 2007/0019693 A1 | 1/2007 | Graham |
| 2013/0178915 A1 | 7/2013 | Radziemski et al. |
| 2015/0050881 A1 | 2/2015 | Chen et al. |
| 2015/0371771 A1 | 12/2015 | Abu Qahouq |
| 2016/0046199 A1 | 2/2016 | Butler et al. |
| 2016/0268815 A1* | 9/2016 | Lee .................. H02J 50/10 |
| 2017/0019511 A1 | 1/2017 | Yang et al. |
| 2017/0366232 A1* | 12/2017 | Lee .................. H02J 50/12 |

* cited by examiner

WIRELESSLY CHARGEABLE PORTABLE POWER BANK

CROSS REFERENCE TO RELATED APPLICATIONS

The present application claims benefit under 35 USC 119(e) of Application Ser. No. 62/520,022 filed Jun. 15, 2017, the content of which is incorporated herein by reference in its entirety.

FIELD OF THE INVENTION

The present invention relates to battery chargers, and more particularly to wireless charging of portable battery chargers.

BACKGROUND OF THE INVENTION

With the proliferation of portable electronic devices, such as smart phones, demand for longer lasting batteries has increased. As the manufacturers of portable electronic devices move toward integration of the Li-ion batteries in the portable devices and as the number of portable devices with removable rechargeable batteries decline, demand for portable battery chargers, also referred to herein as portable power banks has increased.

These power banks, which usually have a relatively high capacity rechargeable battery, enable their users to recharge their phones and other similar devices as needed. However, users may forget to charge their power banks. A need continues to exist for improved power banks.

BRIEF SUMMARY OF THE INVENTION

A power bank, in accordance with one embodiment of the present invention, includes, in part, a rechargeable battery, a wireless power recovery unit adapted to receive power wirelessly, a battery charging circuit adapted to deliver the power recovered by the power recovery unit to the rechargeable battery, an output interface, and a voltage reconditioning circuit adapted to supply power from the rechargeable battery to the output interface for delivery to an external device.

In one embodiment, the wireless power recovery unit includes a multitude of photodiodes adapted to convert a coherent optical signal to electrical power. In one embodiment, the wireless power recovery unit includes an acoustic transducer adapted to convert acoustic waves to an electrical power. In one embodiment, the wireless power recovery unit includes an inductive coupling circuit adapted to convert time varying magnetic flux to electrical power. In one embodiment, the wireless power recovery unit includes an RF power recovery unit adapted to convert an RF signal to electrical power.

In one embodiment, the power bank further includes, in part, an input interface adapted to supply power to the power bank via a wired connection. In one embodiment, the power bank further includes, in part, a voltage sensing circuitry adapted to select between the power supplied by the wireless power recovery unit and the power supplied by the input interface. The selected power is supplied to the rechargeable battery.

In one embodiment, the power bank further includes, in part, a controller adapted to monitor the rechargeable battery, and a wireless link adapted to receive and transmit information. In one embodiment, the controller is further adapted to notify a user, via a mobile device associated with the user, to cause the power bank to be charged. In one embodiment, the controller is further adapted to receive instructions from a mobile device to cause the power bank to be charged when one or more conditions are satisfied. In one embodiment, the instructions cause the power recovery unit to charge the rechargeable battery if the charge stored in the rechargeable battery is detected as falling below a threshold level.

A power bank, in accordance with one embodiment of the present invention, includes, in part, an RF power recovery unit adapted to convert an RF signal to electrical power, and an inductive coupling circuit adapted to convert the power supplied by the RF power recovery unit to a time varying magnetic flux.

A power bank, in accordance with one embodiment of the present invention, includes, in part, a wireless power recovery unit adapted to recover power wirelessly, an output interface, and a voltage reconditioning circuit adapted to deliver the recovered power to an external device via the output interface. In one embodiment, the power bank further includes, in part, a controller, and a wireless link adapted to receive and transmit information. In one embodiment, the power bank further includes, in part, an LCD touchscreen.

A method of power delivery, in accordance with one embodiment of the present invention, includes, in part, recovering a power wirelessly, delivering the recovered power to a rechargeable battery, conditioning a voltage received from the rechargeable battery, and supplying the conditioned voltage to an output interface for delivery to an external device. In one embodiment, the power is recovered by a multitude of photodiodes adapted to convert a coherent optical signal to electrical power. In one embodiment, the power is recovered by an acoustic transducer adapted to convert acoustic waves to an electrical power. In one embodiment, the power is recovered by an inductive coupling circuit adapted to convert time varying magnetic flux to electrical power. In one embodiment, the power is recovered by an RF power recovery unit adapted to convert an RF signal to electrical power.

In one embodiment, the method further includes, in part, supplying the power to the rechargeable battery via a wired connection. In one embodiment, the method further includes, in part, selecting between the recovered power and the power supplied by the wired connection, and delivering the selected power to the rechargeable battery.

In one embodiment, the method further includes, in part, monitoring a status of the rechargeable battery, and wirelessly communicating the status. In one embodiment, the method further includes, in part, notifying a user via a mobile device associated with the user to cause the rechargeable battery to be charged. In one embodiment, the method further includes, in part, transmitting instructions wirelessly to cause the rechargeable battery to be charged when one or more conditions are satisfied. In one embodiment, the condition defines a voltage level of the rechargeable battery.

A method of power delivery, in accordance with one embodiment of the present invention, includes, in part, converting an RF signal to electrical power, and converting the electrical power to a time varying magnetic flux.

A method of power delivery, in accordance with one embodiment of the present invention, includes, in part recovering a power received wirelessly, and delivering the recovered power to an external device via an output interface. In one embodiment, the method further includes, in part, controlling the recovery of the received power via instructions transmitted wirelessly.

A power bank, in accordance with one embodiment of the present invention, includes, in part, a rechargeable battery, an input interface, a battery charging circuit adapted to deliver a power received from the input interface to the rechargeable battery, an output interface, a voltage reconditioning circuit adapted to supply power from the rechargeable battery to the output interface for delivery to an external device, a programmable controller coupled to the battery charging circuit and the voltage conditioning circuit, and a wireless communications link adapted to transmit data to or receive data from an external portable device.

A method of power delivery, in accordance with one embodiment of the present invention, includes, in part, receiving power from a wired input interface, delivering the received power to a rechargeable battery, conditioning a voltage received from the rechargeable battery, supplying the conditioned voltage to an output interface for delivery to an external device, monitoring a status of the rechargeable battery, and wirelessly communicating the status.

In one embodiment, the method further includes, in part, notifying a user via a mobile device associated with the user to cause the rechargeable battery to be charged. In one embodiment, the method further includes, in part, transmitting instructions wirelessly to cause the rechargeable battery to be charged when one or more conditions are satisfied. In one embodiment, the condition defines a voltage level of the rechargeable battery.

DETAILED DESCRIPTION OF THE INVENTION

In accordance with one embodiment of the present invention, a power bank is wirelessly charged. In the following description, it is understood that elements/components identified using the same reference number are identical in structure and operation.

Figure 1:
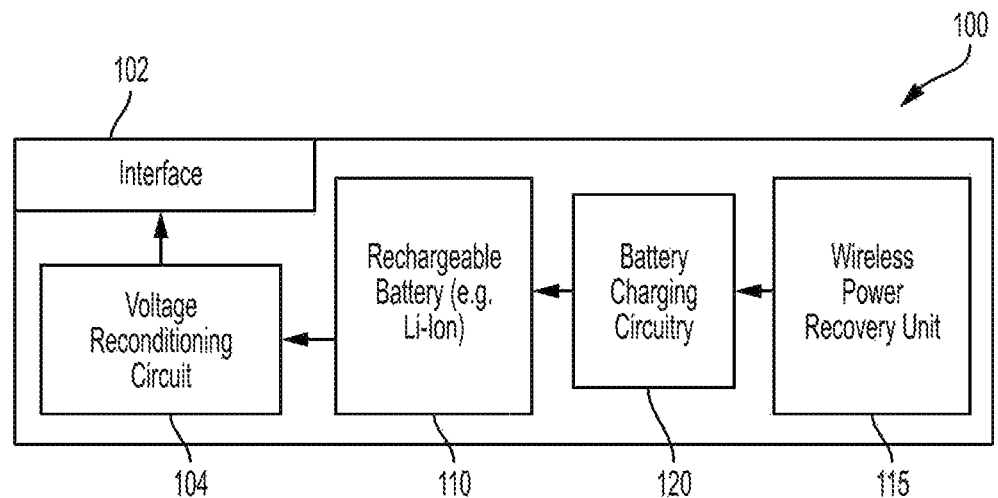
FIG. 1 is a simplified high-level block diagram of a power bank adapted to be wirelessly charged, in accordance with one embodiment of the present invention.

FIG. 1 is a simplified high-level block diagram of a power bank 100 adapted to be wirelessly charged, in accordance with one embodiment of the present invention. Power bank 100 is shown as including, in part, an interface 102, a voltage reconditioning circuit 104, a rechargeable battery 110, a battery charging circuit 120, and a wireless power recovery unit 115.

Interface 102 is adapted to couple battery pack 100 to a device to be charged any may be, for example, a USB interface/port. Voltage conditioning circuit 104 is adapted to condition the power delivered to interface 102 by battery 110. Battery 110 may be a Li-ion battery.

Battery 110 is charged via a DC voltage that battery 110 receives from wireless power recovery unit 115 through battery charging circuitry 120. Wireless power recovery unit 115 is adapted to convert the power it receives wirelessly to a DC voltage. Battery charging circuitry 120 is adapted to charge battery 110 using the DC voltage supplied by power recovery unit 115.

Figure 2:
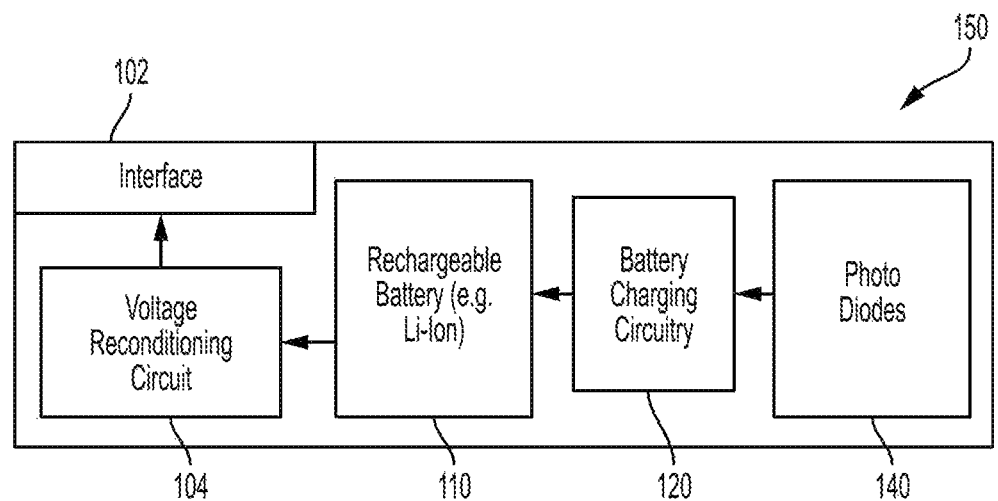
FIG. 2 is a simplified high-level block diagram of a power bank adapted to be wirelessly charged, in accordance with one embodiment of the present invention.

FIG. 2 is a simplified high-level block diagram of a power bank 150 adapted to be wirelessly charged, in accordance with one embodiment of the present invention. Power bank 150 is shown as including, in part, an interface 102, a voltage reconditioning circuit 104, a rechargeable battery 110, a battery charging circuit 120, and one or more photodiodes 140.

Interface 102 and voltage reconditioning circuit 104 operate as described above with reference to FIG. 1. Photodiodes 140 are adapted to convert a coherent optical signal, such as a laser beam, to a DC voltage. Battery charging circuitry 120 is adapted to charge battery 110 using the DC voltage it receives from photodiodes 140. To receive charge, a device is plugged into power bank 150 via interface 102.

Figure 3:
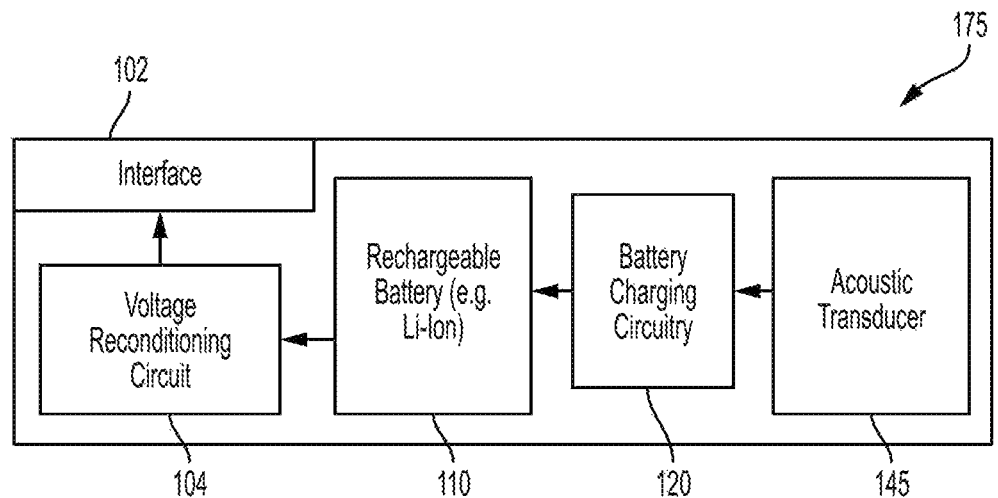
FIG. 3 is a simplified high-level block diagram of a power bank adapted to be wirelessly charged, in accordance with one embodiment of the present invention.

FIG. 3 is a simplified high-level block diagram of a power bank 175 adapted to be wirelessly charged, in accordance with one embodiment of the present invention. Power bank 175 is shown as including, in part, an interface 102, a voltage reconditioning circuit 104, a rechargeable battery 110, a battery charging circuit 120, and an acoustic transducer 145.

Interface 102 and voltage reconditioning circuit 104 operate as described above with reference to FIG. 1. Acoustic transducer 145 is adapted to convert acoustic and pressure waves to a DC voltage. Battery charging circuitry 120 is adapted to charge battery 110 using the DC voltage it receives from acoustic transducer 145.

Figure 4:
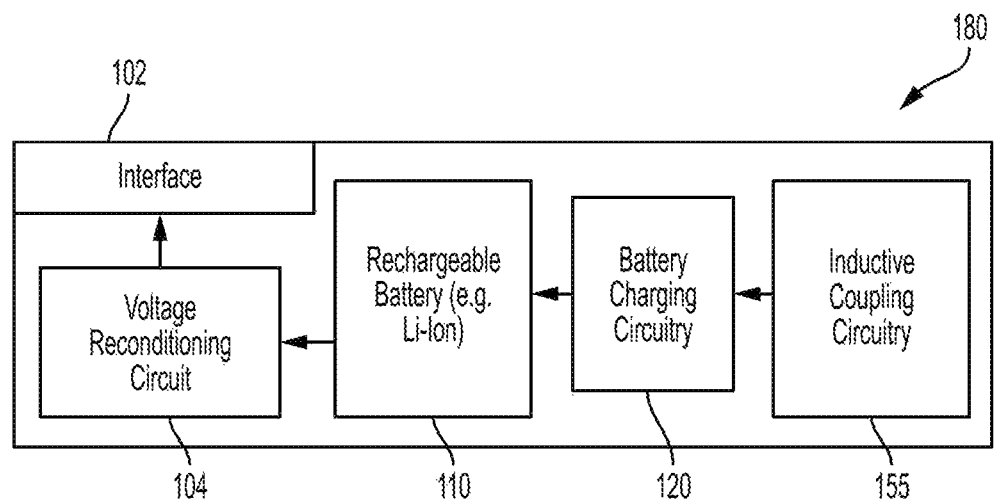
FIG. 4 is a simplified high-level block diagram of a power bank adapted to be wirelessly charged, in accordance with one embodiment of the present invention.

FIG. 4 is a simplified high-level block diagram of a power bank 180 adapted to be wirelessly charged, in accordance with one embodiment of the present invention. Power bank 180 is shown as including, in part, an interface 102, a voltage reconditioning circuit 104, a rechargeable battery 110, a battery charging circuit 120, and an inductive coupling circuit 155.

Interface 102 and voltage reconditioning circuit 104 operate as described above with reference to FIG. 1. Inductive coupling circuit 155 is adapted to receive a time-varying magnetic flux and generate a DC voltage in response. Battery charging circuitry 120 is adapted to charge battery 110 using the DC voltage it receives from inductive coupling circuit 155.

Figure 5:
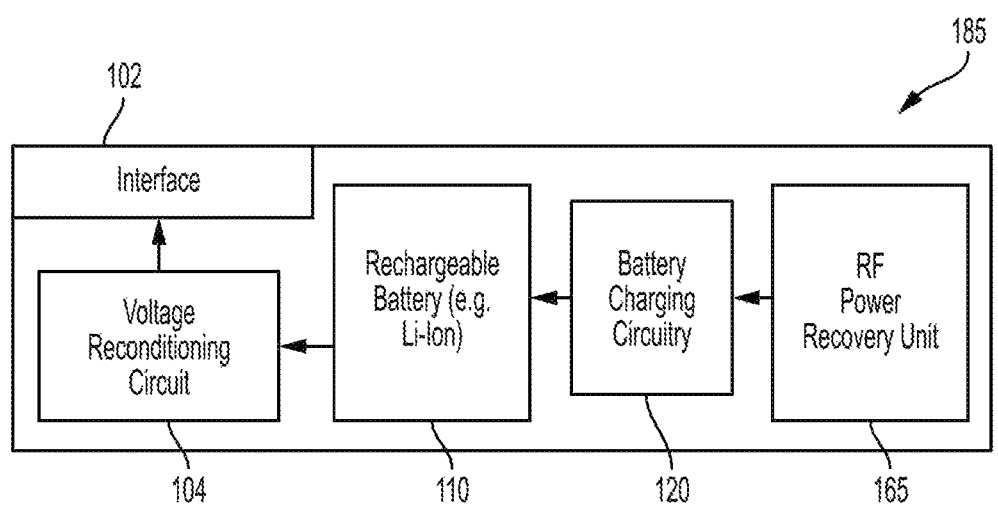
FIG. 5 is a simplified high-level block diagram of a power bank adapted to be wirelessly charged, in accordance with one embodiment of the present invention.

FIG. 5 is a simplified high-level block diagram of a power bank 185 adapted to be wirelessly charged, in accordance with one embodiment of the present invention. Power bank 185 is shown as including, in part, an interface 102, a voltage reconditioning circuit 104, a rechargeable battery 110, a battery charging circuit 120, and RF power recovery unit 165.

Interface 102 and voltage reconditioning circuit 104 operate as described above with reference to FIG. 1. RF power recovery unit 165 is adapted to receive and convert the received RF signal to a DC voltage. Battery charging circuitry 120 is adapted to charge battery 110 using the DC voltage it receives from RF power recovery unit 165.

Figure 6:
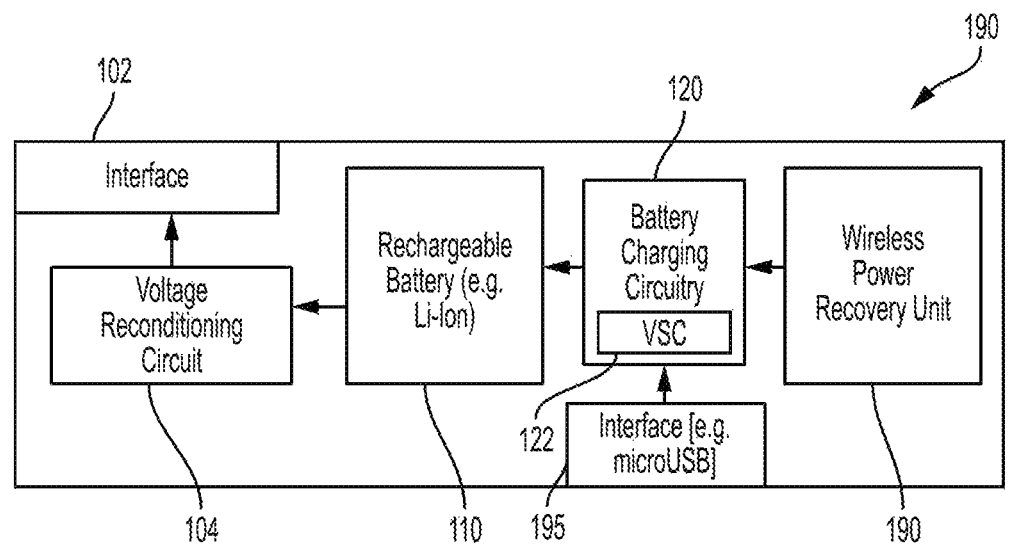
FIG. 6 is a simplified high-level block diagram of a power bank adapted to be wirelessly charged, in accordance with another embodiment of the present invention.

FIG. 6 is a simplified high-level block diagram of a power bank 190 adapted to be wirelessly charged, in accordance with another embodiment of the present invention. Wireless power recovery unit 190 may be any one of, or a combination of one or more of RF power recovery unit 165 shown in FIG. 5, photodiodes 140 shown in FIG. 2, acoustic transducer 145 shown in FIG. 3 and/or inductive coupling circuitry 155 shown in FIG. 4. Power bank 190 is also shown as including, in part, an input interface 195 (e.g., a USB interface) adapted to be plugged into a power source to charge battery 110 via battery charging circuit 120.

Battery charging circuit 120 is shown as including a voltage sensing circuitry (VSC) 122 adapted to compare the amount of voltage received from interface 195 and wireless power recovery unit 190 and select one of these voltages for charging of battery 100. For example, if VSC 122 determines that the amount of power supplied by wired interface 195 is greater than and/or more stable than the amount of power supplied by wireless recovery unit 190, VSC 122 causes battery 110 to be charged via the voltage received from interface 195. In one embodiment, voltage sensing circuitry may be formed by a multitude of diodes connected in parallel.

Figure 7:
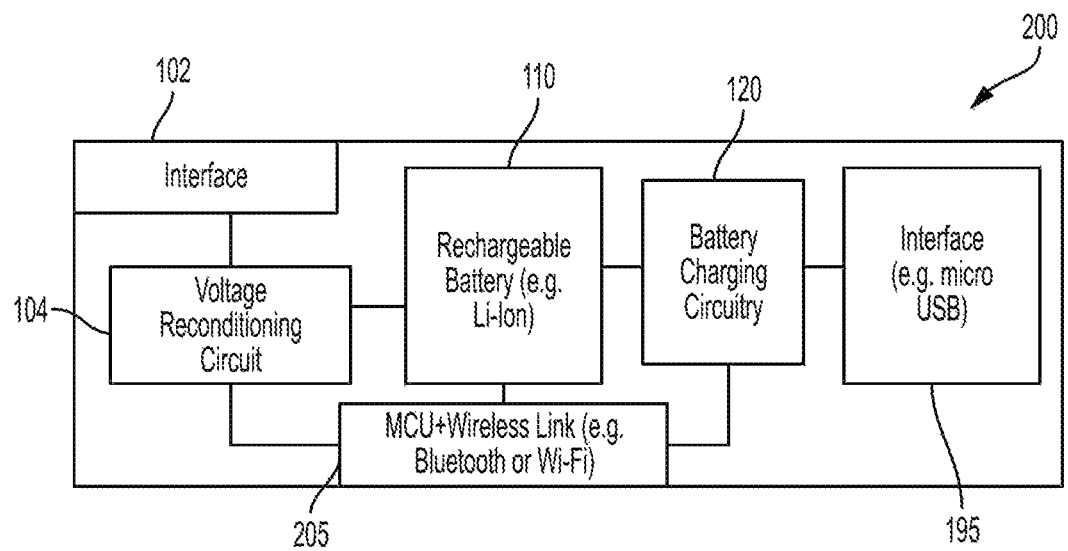
FIG. 7 is a simplified high-level block diagram of a power bank, in accordance with another embodiment of the present invention.

FIG. 7 is a simplified high-level block diagram of a power bank 200, in accordance with another embodiment of the present invention. Power bank 200 includes an output interface 102, a voltage conditioning circuit 104, a rechargeable battery 110, a battery charging circuit 120, and an input interface 195, as was described above. Power back 200 is also shown as including, in part, a micro-controller (MCU) and a wireless link 205, that may conform to any communications standards such as Bluetooth, Wi-Fi, and the like.

An application (not shown) running, for example, on the user's cell phone (not shown), smart watch (not shown), and the like, is wirelessly linked to power bank 200—via microcontroller (MCU) and wireless link 205—to enable the user to monitor the status of charging of power bank 200. For example, information about the charge level, temperature, and the like, may be monitored by the user on another device associated with the user (e.g., his cell phone) and which is wirelessly linked to the power bank via (MCU) and wireless link 205. Such an application may also be used to set a trigger level for charging of the power bank. For example, the user, using the application on his cell phone or smart watch, may set a trigger level of 30% so that when the stored charge in battery 110 falls below 30%, the user is notified to plug in the power bank 100 to, e.g. a USB complaint outlet via USB port 195 to recharge it. In addition to the charge level, the user may also select the time and/or location for the charging of the power bank through the application. For example, the user may select options that cause the application to notify the user to charge the power bank depending on one or more of the following conditions (i) if he/she is at, e.g., home (specific location), and/or (ii) after, e.g., 9 pm (specific time); and/or (iii) the power bank has, e.g., less than 50% charge. The notification thus reminds the user to recharge the power bank at a selected time and place that is convenient and when the charge level falls below a level selected by the user.

Figure 8:
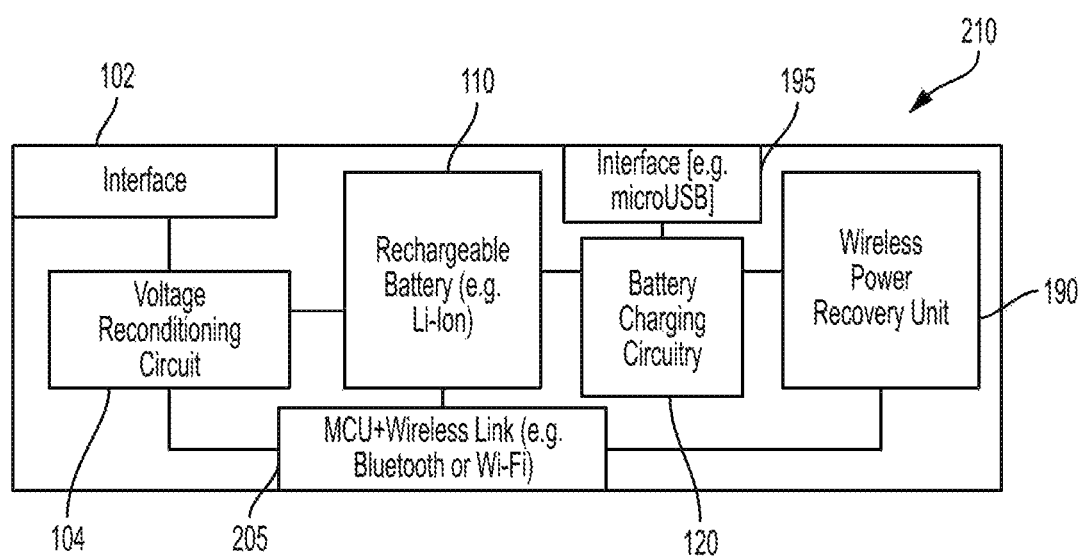
FIG. 8 is a simplified high-level block diagram of a power bank, in accordance with another embodiment of the present invention.

FIG. 8 is a simplified high-level block diagram of a power bank 210, in accordance with another embodiment of the present invention. Power bank 210 includes an output interface 102, a voltage conditioning circuit 104, a rechargeable battery 110, a battery charging circuit 120, an input interface 195, and a wireless power recovery circuit 190. Wireless power recovery unit 190 may be any one of, or a combination of one or more of RF power recovery unit 165 shown in FIG. 6, photodiodes 140 shown in FIG. 2, acoustic transducer 145 shown in FIG. 3 and/or inductive coupling circuitry 155 shown in FIG. 4. Power back 200 is also shown as including, in part, a micro-controller (MCU) and a wireless link 205, adapted to conform to any communications standards such as Bluetooth, Wi-Fi, and the like.

An application (not shown) running, for example, on the user's cell phone (not shown), smart watch (not shown), and the like, is wirelessly linked to power bank 200—via microcontroller (MCU) and wireless link 205—to enable the user to monitor the status of charging of power bank 200. For example, information about the charge level, temperature, and the like may be monitored by the user on another device associated with the user (e.g., his cell phone) and which is wirelessly linked to the power bank via (MCU) and wireless link 205. Such an application may also be used to set a trigger level for charging of the power bank. For example, the user, using the application on his cell phone or smart watch, may set a trigger level of 25% so that when the stored charge of the battery 110 falls below 25%, either the user is notified to plug in the power bank 100 to a power outlet via, e.g., USB port 195 to recharge it. Alternatively, under such conditions, power bank 210 is configured to activate wireless power recovery unit 190 to charge the battery. If the amount of power received by wireless recovery unit 190 is detected to be below a minimum predefined threshold value, the user may be notified to plug the power bank into an outlet via USB port 195.

In addition to the charge level, the user may also select the time and/or location for the charging of the power bank through the application. For example, the user may select options that cause the application either to notify the user to charge the power bank, depending on one or more of the following conditions (i) if he/she is at, e.g., home (specific location), and/or (ii) after, e.g., 9 pm (specific time); and/or (iii) the power bank has, e.g., less than 50% charge. The notification thus reminds the user to recharge the power bank at a selected time and place that is convenient and when the charge level falls below a level selected by the user. The user may also select option via his/her cell phone or smart watch to cause the battery to be charged by wireless power recovery unit 190 if, for example, the battery charge level falls below a first threshold value, and the amount of wireless power being received wirelessly is detected as being greater than a second threshold value.

Figure 9:
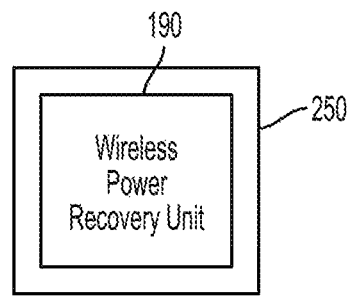
FIG. 9 is a simplified high-level block diagram of a power bank, in accordance with another embodiment of the present invention.

FIG. 9 is a simplified high-level block diagram of a power bank 250, in accordance with another embodiment of the present invention. Power bank 210 is shown as including a wireless power recovery circuit 190. Wireless power recovery unit 190 may be any one of, or a combination of one or more of RF power recovery unit 165 shown in FIG. 5, photodiodes 140 shown in FIG. 2, acoustic transducer 145 shown in FIG. 3 and/or inductive coupling circuitry 155 shown in FIG. 4.

Figure 10:
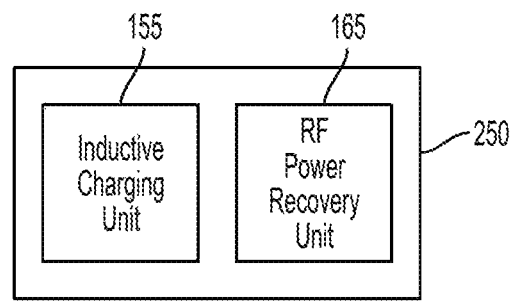
FIG. 10 is a simplified high-level block diagram of a power bank, in accordance with another embodiment of the present invention.

FIG. 10 is a simplified block diagram of one exemplary embodiment of power bank 250. Power bank 250 is shown as including an RF power recovery unit 165 and an inductive charging circuit/unit 155, but does not include a rechargeable battery. Power bank 250 may receive power from RF signals via RF power recovery unit 165 and deliver the received power to activate inductive charging unit 155. A portable device, such as a cell phone, smart watch, and the like adapted to be inductively charged and resting on a charging pad that includes the inductive charging unit 155 may thus be charged by power bank 190.

Figure 11:
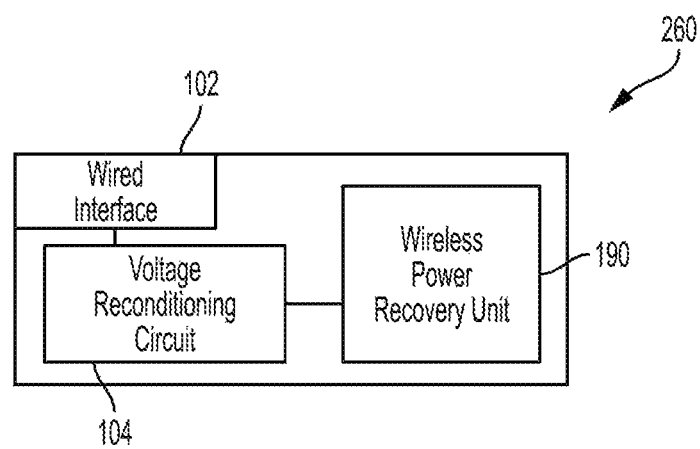
FIG. 11 is a simplified high-level block diagram of a power bank, in accordance with another embodiment of the present invention.

FIG. 11 is a simplified high-level block diagram of a power bank 260, in accordance with another embodiment of the present invention. Power bank 260 is shown as including a wireless power recovery circuit 190, a voltage reconditioning circuit 104 and an interface, such as a USB interface. Wireless power recovery unit 190 may be any one of, or a combination of one or more of RF power recovery unit 165 shown in FIG. 5, photodiodes 140 shown in FIG. 2, acoustic transducer 145 shown in FIG. 3 and/or inductive coupling circuitry 155 shown in FIG. 4. Power bank 260 is adapted to receive, for example, power from RF signals via RF power recovery unit 220 and deliver the received power to a portable device, such as a cell phone that is plugged into, e.g., USB port 102. Voltage reconditioning circuit 104 converts the DC voltage supplied by RF recovery unit 220 to the format required by USB port 102.

Figure 12:
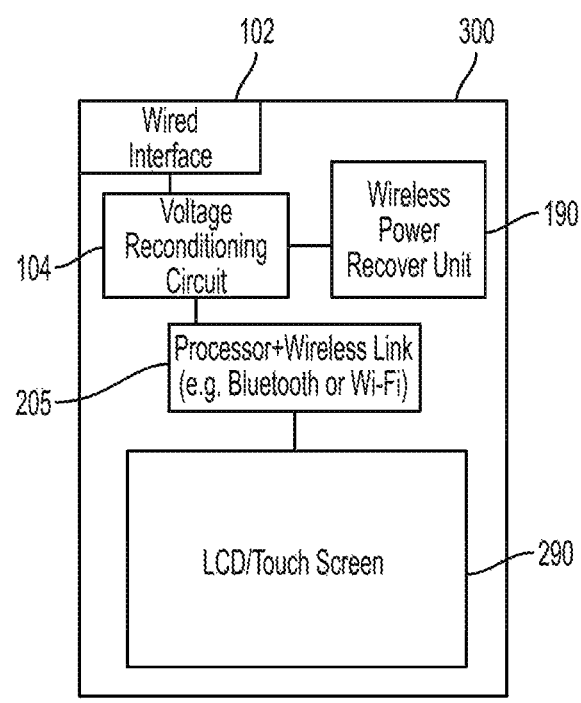
FIG. 12 is a simplified high-level block diagram of a power bank, in accordance with another embodiment of the present invention.

FIG. 12 is a simplified high-level block diagram of a power bank 300, in accordance with another embodiment of the present invention. Power bank 300 is shown as including a wireless power recovery circuit 190, a voltage reconditioning circuit 104, an interface, such as a USB interface 102, a micro-controller (MCU) and a wireless link 205, that may conform to any communications standards such as Bluetooth, Wi-Fi, and the like, and an LCD screen 290 that may be a touch screen.

Wireless power recovery unit 190 may be any one of, or a combination of one or more of RF power recovery unit 165 shown in FIG. 5, photodiodes 140 shown in FIG. 2, acoustic transducer 145 shown in FIG. 3 and/or inductive coupling circuitry 155 shown in FIG. 4. Power received by wireless power recovery unit 190 is conditioned by voltage reconditioning circuit 104 and supplied to wired interface (e.g., USB port) 102. MCU and wireless link 205 operate in the same manner as described above with reference to FIGS. 6 and 7.

Power bank 300 may be provided by a service provider, such as restaurant or a coffee shop, to a user sitting at the restaurant or the coffee shop. The LCD may be used by the user, for example, to place an order. Alternatively, the service provider may provide information to the user via the LCD screen. For example, if the service provider is a restaurant at an airport, it may provide the user/customer with flight information. The user/customer may also use power bank 300 to charge a portable device by, for example, plugging his/her portable device into USB port 102. Power bank 300 is adapted to receive power via power recovery unit 190, as described above with reference to FIGS. 10 and 11.

Figure 13:
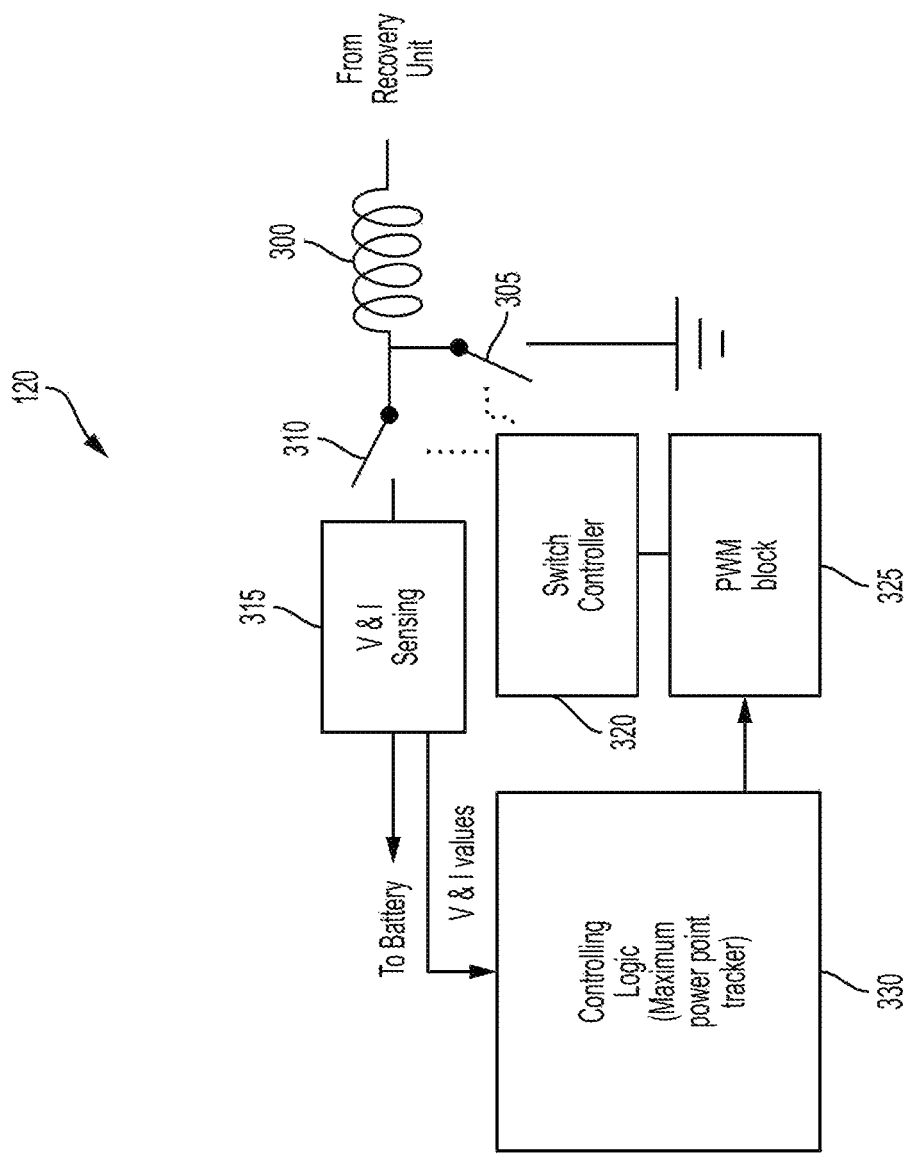
FIG. 13 is simplified high-level block diagram of a battery charging circuitry, in accordance with another embodiment of the present invention.

FIG. 13 is a number of components of battery charging circuitry 120 described in any of the above embodiments. The voltage that is provided by the wireless power recovery unit 115 may not be sufficient to charge a lithium-ion battery. Moreover, wireless power recovery unit 115 operates more efficiently and provides a higher output power when its output load has an optimum value. The optimum load and the current drawn from power recovery unit 115 may depend on the power incident on power recovery unit 115 and hence the load, in accordance with one embodiment of the present invention, is dynamically adjusted.

As described further below, battery charging circuitry 120 is adapted to increase the voltage supplied by power recovery unit 115 to match that of the battery. Switch controller 320 is adapted to close one of the switches 305 or 310 at any given time. Therefore, when controller 320 closes switch 305, it opens switch 310. Conversely, when controller 320 open switch 305, it close switch 310.

When switch controller 320 closes switch 305 and opens switch 310, because the current flowing from power recovery unit to inductor 300 cannot increase instantaneously, the current in the inductor starts to increase. The current increase in the inductor continues until switch controller 320 open switch 305 and closes switch 310. When switch 310 closes the current stored in inductor 300 is enable to charge the battery after flowing through voltage and current sensing block 315. Therefore, by changing the duty cycle of the current pulses supplied to the battery through opening and closing of switches 305 and 310, the average current and hence the time it takes to charge the battery is optimized. Block 315 is adapted to sense the current being delivered to the battery and/or sense the voltage stored the battery. The current and/or voltage so sensed by block 315 are also delivered to controlling logic 330. In response, controlling logic controls the width of the pulses that pulse-width modulator (PWM) block 325 generates and applies to switches 305 and 310. In other words, through the feedback mechanism shown in FIG. 13, the width of the pulses applied to switches 305 and 310, and hence the duty cycle of the current pulses supplied to the battery is maintained at an optimum level while ensuring that the battery is not over charged.

The above embodiments of the present invention are illustrative and not limitative. The embodiments of the present invention are not limited by the number of transmitting elements or receiving elements. The above embodiments of the present invention are not limited by the wavelength or frequency of the signal. The above embodiments of the present invention are not limited by the type of circuitry used to charge a battery or to condition the voltage supplied by a battery. The above embodiments of the present invention are not limited by the number of semiconductor substrates that may be used to form the power bank. Other modifications and variations will be apparent to those skilled in the art and are intended to fall within the scope of the appended claims.

What is claimed is:

1. A power bank comprising:
a rechargeable battery;
a wireless power recovery unit adapted to receive power wirelessly;
a battery charging circuit adapted to deliver the power recovered by the power recovery unit to the rechargeable battery;
an output interface; and
a voltage reconditioning circuit adapted to supply power from the rechargeable battery to the output interface for delivery to an external device, wherein said wireless power recovery unit includes a plurality of photodiodes adapted to convert a coherent optical signal to electrical power.

2. A power bank comprising:
a rechargeable battery;
a wireless power recovery unit adapted to receive power wirelessly;
a battery charging circuit adapted to deliver the power recovered by the power recovery unit to the rechargeable battery;
an output interface; and
a voltage reconditioning circuit adapted to supply power from the rechargeable battery to the output interface for delivery to an external device, wherein said wireless power recovery unit includes an acoustic transducer adapted to convert acoustic waves to an electrical power.

3. A power bank comprising:
a wireless power recovery unit adapted to receive power wirelessly;
a battery charging circuit adapted to deliver the power recovered by the power recovery unit to the rechargeable battery;
an output interface; and
a voltage reconditioning circuit adapted to supply power from the rechargeable battery to the output interface for delivery to an external device, wherein said wireless power recovery unit includes an RF power recovery unit adapted to convert an RF signal to electrical power.

4. The power bank of claim 3 further comprising:
an input interface adapted to supply power to the power bank via a wired connection.

5. The power bank of claim 4 further comprising a voltage sensing circuitry adapted to select between the power supplied by the wireless power recovery unit and the power supplied by the input interface, the selected power being supplied to the rechargeable battery.

6. The power bank of claim 3 further comprising:
a controller adapted to monitor the rechargeable battery; and
a wireless link adapted to receive and transmit information.

7. The power bank of claim 6 wherein said controller is further adapted to notify a user, via a mobile device associated with the user, to cause the power bank to be charged.

8. The power bank of claim 6 wherein said controller is further adapted to receive instructions from a mobile device to cause the power bank to be charged when one or more conditions are satisfied.

9. The power bank of claim 8 wherein said instructions cause the power recovery unit to charge the rechargeable battery if the charge stored in the rechargeable battery is detected as falling below a threshold level.

10. A power bank comprising:
an RF power recovery unit adapted to convert an RF signal to electrical power; and
an inductive coupling circuit adapted to convert the power supplied by the RF power recovery unit to a time varying magnetic flux.

11. A method of power delivery comprising:
recovering power wirelessly;
delivering the recovered power to a rechargeable battery;
conditioning a voltage received from the rechargeable battery; and
supplying the conditioned voltage to an output interface for delivery to an external device, wherein said power is recovered by a plurality of photodiodes adapted to convert a coherent optical signal to electrical power.

12. A method of power delivery comprising:
recovering power wirelessly;
delivering the recovered power to a rechargeable battery;
conditioning a voltage received from the rechargeable battery; and
supplying the conditioned voltage to an output interface for delivery to an external device, wherein said power is recovered by an acoustic transducer adapted to convert acoustic waves to an electrical power.

13. A method of power delivery comprising:
recovering power wirelessly;
delivering the recovered power to a rechargeable battery;
conditioning a voltage received from the rechargeable battery; and
supplying the conditioned voltage to an output interface for delivery to an external device, wherein said power is recovered by an RF power recovery unit adapted to convert an RF signal to electrical power.

14. The method of claim 13 further comprising:
supplying power to the rechargeable battery via a wired connection.

15. The method of claim 14 further comprising:
selecting between the recovered power and the power supplied by the wired connection; and
delivering the selected power to the rechargeable battery.

16. The method of claim 13 further comprising:
monitoring a status of the rechargeable battery; and
wirelessly communicating the status.

17. The method of claim 16 further comprising:
notifying a user via a mobile device associated with the user to cause the rechargeable battery to be charged.

18. The method of claim 13 further comprising:
transmitting instructions wirelessly to cause the rechargeable battery to be charged when one or more conditions are satisfied.

19. The method of claim 18 wherein said condition defines a voltage level of the rechargeable battery.

20. A method of power delivery comprising:
converting an RF signal to electrical power; and
converting the electrical power to a time varying magnetic flux.

* * * * *